United States Patent

Awano et al.

[11] Patent Number: 5,909,410
[45] Date of Patent: Jun. 1, 1999

[54] OPTICAL MAGNETIC RECORDING MEDIUM AND OPTICAL MAGNETIC REPRODUCING METHOD

[75] Inventors: Hiroyuki Awano, Noda; Hiroaki Nemoto, Kokubunji, both of Japan

[73] Assignees: Hitachi, Ltd., Tokyo; Hitachi Maxell, Ltd., Osaka, both of Japan

[21] Appl. No.: 08/796,525

[22] Filed: Feb. 7, 1997

[30] Foreign Application Priority Data

Feb. 9, 1996 [JP] Japan .................................. 8-023689

[51] Int. Cl.$^6$ .................................................. G11B 11/00
[52] U.S. Cl. ...................................... 369/13; 428/694 ML
[58] Field of Search .................................. 369/13, 275.2, 369/110, 275.4, 116, 275.3, 284, 288, 283, 286; 428/694 ML, 694 MT, 694 MM; 360/114, 59; 365/122

[56] References Cited

U.S. PATENT DOCUMENTS

| | | | |
|---|---|---|---|
| 5,502,692 | 3/1996 | Osato | 369/13 |
| 5,615,180 | 3/1997 | Mieda et al. | 369/13 |
| 5,640,374 | 6/1997 | Hirokane et al. | 369/13 |

FOREIGN PATENT DOCUMENTS

| | | |
|---|---|---|
| 3-93056 | 4/1991 | Japan . |
| 3-93058 | 4/1991 | Japan . |
| 5-12731 | 1/1993 | Japan . |
| 6-223427 | 8/1994 | Japan . |

OTHER PUBLICATIONS

N. Nishimura et al, "Magneto–Static Coupling MSR with In–Plane Magnetization Films", International Symposium On Optical Memory 1995, Technical Digest, pp. 27–28.

*Primary Examiner*—Ali Neyzari
*Attorney, Agent, or Firm*—Fay, Sharpe, Beall, Fagan, Minnich & McKee

[57] ABSTRACT

An optical magnetic recording medium includes a first magnetic film for holding information in a status of either an upward or a downward magnetization, a second magnetic film closely adjacent to the first magnetic film and an in-plane magnetization film positioned between the first and second magnetic films, the in-plane magnetization film having such a characteristic that its magnetic characteristics are switched between a first temperature range and a second temperature range. The in-plane magnetization film is kept within the first temperature range at a room temperature and, at the time of an information reproduction, the in-plane magnetization film is locally heated to the second temperature range by an irradiation of an energy beam so that information on the recording layer is copied to the reproduction layer, and the copied information is observed.

13 Claims, 3 Drawing Sheets

OPTICAL MAGNETIC RECORDING MEDIUM AND OPTICAL MAGNETIC REPRODUCING METHOD

BACKGROUND AND SUMMARY OF THE INVENTION

The present invention relates to an optical magnetic recording medium for carrying out a recording, a reproducing and an erasing of information, and a method of reproducing information in an optical magnetic recording medium.

A reproduction of a record on an optical magnetic disk is carried out by using a laser beam. A spot diameter on a recording film can be expressed by $\lambda/NA$, where NA represents the numerical aperture (usually about 0.5) of an objective lens to be used and $\lambda$ represents a wavelength of a laser. When the wave-length is 680 nm and NA is equal to 0.55, the spot diameter becomes about 1.2 $\mu$m. An existence of only one record magnetic domain (mark) in the spot diameter is a proper condition of reproduction. In other words, the shortest length of the record magnetic domain that can be reproduced is 1.2 $\mu$m/=0.6 $\mu$m.

As described above, the recording density is improved when the wavelength of a semiconductor laser is short. However, under current circumstances, it is not possible to expect the shortening of the wavelength of a semiconductor laser at a very early stage. Relating to this, a technique for improving a reproduction resolution by utilizing the magnetic characteristics of a recording film has been proposed in Japanese Patent laid-open Publication No. JP-A-3-93056, for example.

According to this technique, a recording film is structured by three kinds of magnetic film, and a part of information recorded on another magnetic layer is compulsively masked by a magnetic layer at a beam incident side to effectively improve the reproduction resolution. The recording film is structured by the three kinds of magnetic layer of a reproduction layer, an intermediate layer and a recording layer, from the beam incident side.

The above-described content is a magnetic super-resolution effect and this is called "magnetic super-resolution". A magnetic mask shape to be compulsively generated within a spot is determined by a temperature distribution on a recording film generated by a reproduction light.

There are the following three main types in the above-described magnetic super-resolution:

A first is FAD (Front Aperture Detection) as disclosed in the Japanese Patent laid-open Publication No. JP-A-3-93056 according to which a magnetic domain can be observed only at a low temperature section within a light spot. A second is RAD (Rear Aperture Detection, reference the Japanese Patent laid-open Publication No. JP-A-63-93058) according to which a magnetic domain can be observed only at a high temperature section within a light spot. A third is CAD (Center Aperture Detection, reference the Japanese Patent laid-open Publication No. JP-A-5-12731).

The first (FAD) is effective for improving the scanning density but it is not possible to increase the track density because a magnetic domain of a low temperature section, that is, the magnetic domain recorded on both sides of the adjacent tracks, is also leaked into a signal. Further, the FAD also has a handicap of an apparatus that a reproduction magnetic domain of several hundred Oe is necessary.

In the case of the second (RAD), only the information at a high temperature section, that is, the information near the center of the spot, can be observed. Therefore, there is no leakage of a magnetic domain of the surrounding low temperature section into a signal. Accordingly, the RAD is suitable for increasing both the track density and the scanning density. However, a magnetic domain copied to a reproduction layer deviated from the spot remains as it is, and therefore the magnetic super-resolution effect cannot be exhibited at the time of reading the information next time.

Accordingly, in the case of the RAD, it is necessary to erase in advance the magnetic domain copied to the reproduction layer at a sufficiently low temperature of the disk at the reproduction section. Thus, in the case of the RAD, it is also necessary to install a large permanent magnet of several kOe within the apparatus. This is a problem in providing a compact apparatus.

A magnetic field which is sufficiently large enough for preparing the magnetization of the reproduction layer in one direction is called an "initialization magnetic field" which is the magnetic field necessary for the initialization. This can be given by the following expression.

A minimum required initialization magnetic field= (coercive force of the reproduction layer)+(exchange-coupled magnetic field which is received by the reproduction layer from the adjacent magnetic layers)+(magneto-statically coupled magnetic field which is received by the reproduction layer from the adjacent magnetic layers) - - - (1)

In this case, the exchange-coupled magnetic field is a magnetic field which tries to cancel the torsion of a spin between the reproduction layer and the adjacent magnetic layers. The magneto-statically coupled magnetic field in this case refers to a portion of the magnetic field that extends from the inside of a magnetic domain recorded on a recording layer to the outside and affects the reproduction layer. Accordingly, in order to reduce the initialization magnetic field, it is necessary to make smaller the exchange-coupled magnetic field or the magneto-statically coupled magnetic field that is received by the reproduction layer from another magnetic layer. However, when the initialization magnetic field is reduced by making smaller the exchange-coupled magnetic field or the magneto-statically coupled magnetic field at ambient temperature, the magneto-statically coupled magnetic field and the exchange-coupled magnetic field are made further smaller at a high temperature, so that the information on the recording layer cannot be copied to the reproduction layer. Consequently, there is a limit to the reduction of the initialization magnetic field.

The third (CAD) does not require the initialization magnetic field. In the CAD, a magnetic layer having such characteristics that the magnetization faces within the plane at ambient temperature but faces a perpendicular direction when the temperature rises is used for the reproduction layer. In the case of the above-described RAD, there are only two types of magnetization status of the reproduction layer that the magnetization is either in the upward direction or in the downward direction and it is possible to achieve a contrast necessary for a super-resolution. However, in the case of the CAD, a super-resolution effect as obtained in the RAD cannot be achieved because there are various statuses of magnetization of the reproduction layer, ranging from the upward direction to the downward direction.

As explained above, each of the FAD, RAD and CAD has problems in practical application. In other words, according to the above-described prior-art techniques, an optical magnetic recording medium which can carry out a super-resolution reproduction at high contrast with both high track density and high scanning density and which does not require a reproduction magnetic field and an initialization magnetic field has not been obtained.

With a view to eliminating the above-described drawbacks, it is an object of the present invention to provide an optical magnetic recording medium which can satisfy all the above-described requirements, and a recording and reproducing method using the same. More particularly, it is an object of the present invention to provide an optical magnetic recording medium which does not require either an initialization magnetic field or a reproduction magnetic field and which can carry out a high-density reproduction with a magnetic super-resolution effect at 200 Oe or below that does not affect the structure of an apparatus, and a recording and reproducing method using the same.

In the abstract, the present invention includes a recording layer for holding information, a reproduction layer to which information on a recording film is copied and an intermediate layer positioned between the recording layer and the reproduction layer, wherein the intermediate layer has an in-plane magnetization component within a specific temperature range.

It is desirable that the recording layer has an easy magnetization axis perpendicular to the surface of the medium and holds information in either the upward or downward magnetization status. It is also desirable that the reproduction layer has an easy magnetization axis perpendicular to the surface of the medium and the information on the recording film is copied to this reproduction layer. It is further desirable that the recording layer and the reproduction layer are calibrated as vertical magnetization films. The intermediate layer has an in-plane magnetization component within a specific temperature range and plays the role of a switching layer by losing the magnetization component within a specific temperature range.

Further, the present invention includes a recording layer for holding information in the status of either an upward magnetization or a downward magnetization, a reproduction layer closely adjacent to a recording film and an intermediate layer located between the recording layer and the reproduction layer. Further, the present invention uses an optical magnetic recording medium in which the intermediate layer has an in-plane magnetization component within a first temperature range and loses the in-plane magnetization component within a second temperature range, and at the time of reproducing information, maintains the intermediate layer locally within the second temperature range by an irradiation of an energy beam so that the information on the recording layer is copied to the reproduction layer to enable observation of the copied information. Alternately, an in-plane magnetization film is used for the intermediate layer, and has a characteristic that the magnetic characteristics are switched between the first temperature range and the second temperature range. Normally, at the time of information reproduction, the in-plane magnetization film is locally heated by the irradiation of an energy beam so that the information on the recording layer is copied to the reproduction layer to enable observation of the copied information.

As a detailed structure of a medium, an optical magnetic recording medium is provided having a dielectric film formed on a substrate, a recording film including at least three layers of magnetic film formed by either a magneto-static coupling or an exchange-coupling on said dielectric film, and a recording film formed by a dielectric film and/or a metal film. Further, in between the reproduction layer and the recording layer of the above-described recording films, an intermediate layer in which a magnetization is faced in-plane within a temperature range from at least 50° C. to the Curie temperature is inserted. Further, it is desirable that the sum of the coercive force of the reproduction layer and the magneto-statically coupled magnetic field and the exchange-coupled magnetic field received by the reproduction layer is smaller than 200.

This application relates to U.S. patent application Ser. No. 08/126,766 filed on Sep. 27, 1993 entitled Overwritable Optical Recording Medium and Recording Method of the Same, by Takeshi MAEDA et al. and assigned to HITACHI, LTD.

DESCRIPTION OF THE PREFERRED EMBODIMENTS

The optical magnetic recording medium relating to the present invention has the above-described advantages of the RAD and CAD. In the case of the RAD, since it is necessary to copy the magnetic domain of the recording layer to the reproduction layer at a high temperature, the exchange-coupled magnetic field needs to be taken large. Therefore, a large initialization magnetic field is necessary.

According to the present invention, an intermediate magnetic layer having a magnetization in-plane component within a temperature range from at least 50° C. to 140° C., for example, is disposed between the recording layer and the reproduction layer. The intermediate layer has an in-plane magnetization component within a predetermined temperature range. In other words, the intermediate layer functions as a barrier layer for preventing the information on the recording layer from being copied to the reproduction layer. In this case 50° C. corresponds to the ambient temperature inside an apparatus at which an optical disk unit is usually operating, that is, a temperature of the recording medium when the apparatus is operating.

Figure 2:
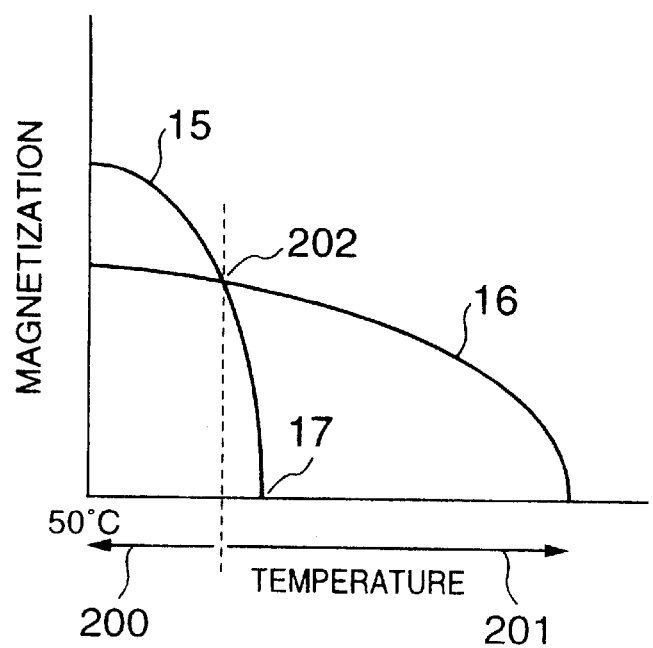
FIG. 2 is a graph for showing the relationship between the magnetic field shielding effect of the in-plane magnetization intermediate layer and the switch and magneto-statically coupled magnetic fields received by the reproduction layer.

FIG. 2 shows an operation of the intermediate layer. An exchange-coupled magnetic field and a magneto-statically coupled magnetic field 16 received by the reproduction layer from the recording layer are smaller than a magnetic field 15 which can be shielded by the intermediate layer within a temperature range near 50° C. which is ambient temperature. Accordingly, the magnetic domain of the recording layer cannot be copied to the reproduction layer in a temperature range 200 which is lower than the temperature at a cross point 202 between the magnetic field 15 that can be shielded by the intermediate layer at a reproduction time and the exchange-coupled magnetic field and the magneto-statically coupled magnetic field 16 received by the reproduction layer from the recording layer. Further, a magnetic domain copied to the reproduction layer can be erased by a very small external magnetic field (including a leakage magnetic field from an actuator) of 200 Oe or below. Referance numeral 17 represents a Curie temperature of the intermediate layer, and the intermediate layer loses an in-plane magnetization in a region of a temperature higher than this Curie temperature, so that a magnetic field that can be shielded becomes theoretically zero.

On the other hand, in a temperature range 201 at which the magnetic field is heated by a reproduction spot and which is higher than the temperature of the cross point 202 between the curves 15 and 16 in FIG. 2, the magnetic field 15 that can be shielded by the intermediate layer becomes smaller than the sum 16 of the magneto-statically coupled magnetic field and the exchange-coupled magnetic field from the recording layer, so that the magnetic domain of the recording layer is copied to the reproduction layer.

Since the optical magnetic recording medium relating to the present invention employs the above-described structure, a large reproduction magnetic field or an initialization magnetic field is not necessary and the reproduction layer has only two statuses of spin which face upward and downward. Consequently, an ideal magnetic super-resolution can be achieved.

As a structure of the medium of the present invention, an optical magnetic recording medium is provided having a dielectric film formed on a substrate, a recording film including at least three layers of magnetic film formed by either a magneto-static coupling or a switch coupling on said dielectric film, and a recording film formed by a dielectric film and/or a metal film.

The basic structure and the principle of the recording film portion of the present invention will be explained with reference to FIG. 1. When the sum of the coercive force of the magneto-statically coupled magnetic field and the exchange-coupled magnetic field at 50° C. received by a reproduction layer from a recording layer 6 is smaller than the coercive force of the reproduction layer, the magnetic domain of the recording layer 6 is not copied to the reproduction layer 4. As already explained, 50° C. corresponds to the temperature inside an apparatus at which an optical disk unit is usually operating. Further, since only the two statuses of magnetization of the recording layer, that is an upward and a downward magnetization, are desirable for obtaining an ideal magnetic super-resolution effect, it is desirable that a rectangularity ratio of the hysteresis at 50° C. of the reproduction layer is 0.9 or above.

Figure 3:
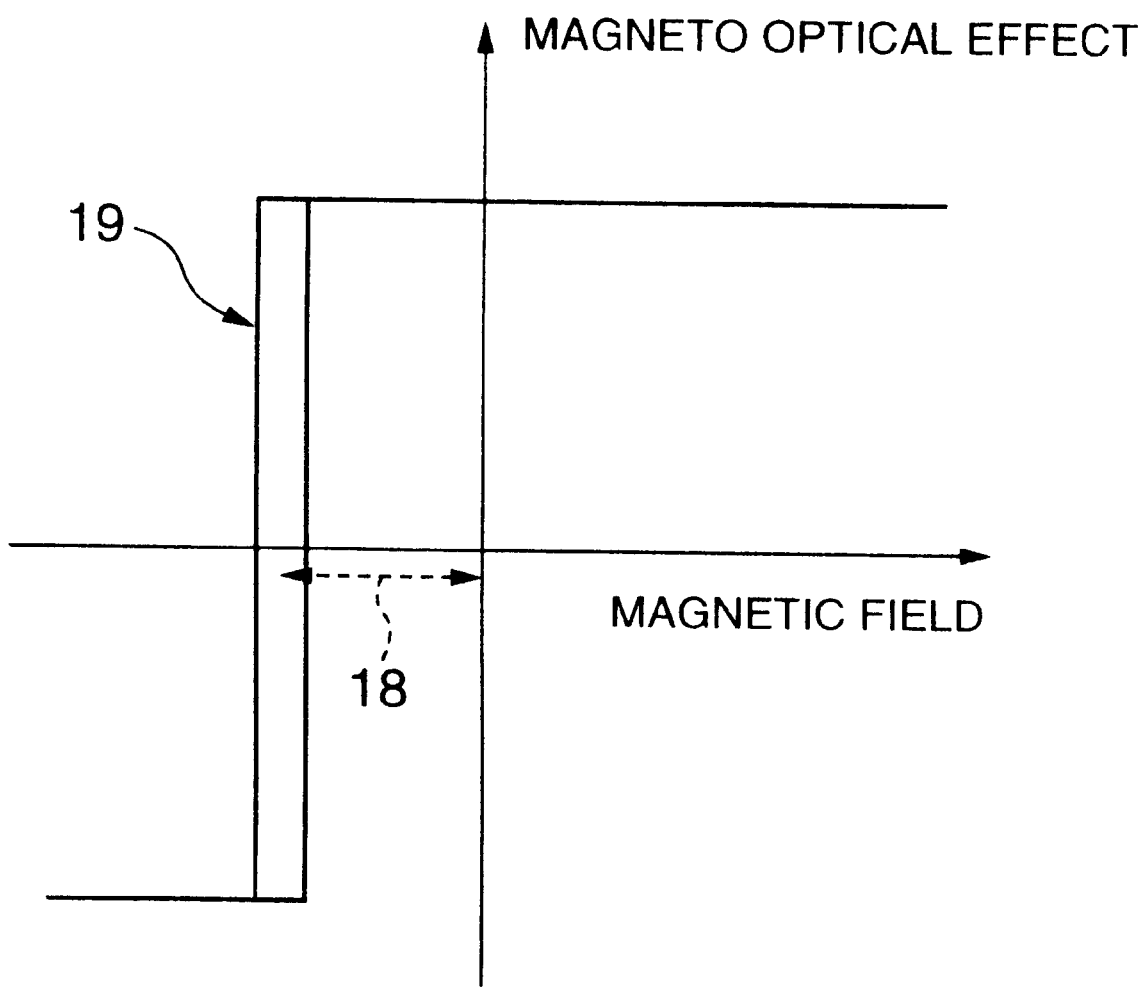
FIG. 3 is a graph for showing a hysteresis loop of the magneto-optical effect measured from the reproduction layer side and the recording layer side.

The rectangularity ratio means, as is well-known, a value obtained by dividing the value of a magneto-optical effect when the magnetic field is zero by the value of a magneto-optical effect when the magnetic field is continued to be applied until when the magnetic field is almost saturated when a hysteresis curve of the magneto-optical effect is drawn as shown in FIG. 3.

A temperature at which a magnetic super-resolution is generated within a reproduction light spot is set in a range from about 50° C. to 140° C. When the sum of the coercive force of the magneto-statically coupled magnetic field and the exchange-coupled magnetic field at this temperature is larger than the coercive force of the reproduction layer, the magnetic domain of the recording layer is copied to the reproduction layer.

The above-described status can be obtained with good controllability when the intermediate layer 5 is disposed between the reproduction layer 4 and the recording layer 6. It is desirable that the Curie temperature 17 of the intermediate layer 5 is lower than the Curie temperature of the other magnetic layers by 50° C. or more, to be in the range from 50° C. to 140° C., in which a part of the magnetization of the intermediate layer faces in-plane. This status can be judged from the Hall effect, a magnetization measurement and a measurement of a magneto-optical effect.

As shown in FIG. 2, the Curie temperature 17 of the intermediate layer is set to be low since it is necessary to attenuate the shielding effect of the intermediate layer 5 in order to copy information to the reproduction layer in the static magnetic field and switch magnetic field from the recording layer. Further, for the intermediate layer to have an in-plane component at a temperature from 50° C. to 140° C., it may be formed with a film of a magnetic material using a ferromagnetic material as a base.

In an optical magnetic recording medium having a recording layer formed with two or more layers of magnetic film, when the sum of the coercive force of the magnetic layer positioned at the substrate side and the magneto-statically coupled magnetic field and the exchange-coupled magnetic field is smaller than 200 Oe when the magneto-optical effect at 50° C. is measured from the substrate side, a magnetic domain copied to the reproduction layer can be erased. In other words, according to the present embodiment, a copied magnetic domain can be erased by a fine magnetic field at the time of reproducing information, so that a provision of a compact apparatus can be achieved. As the magnetic field for erasing a magnetic domain, a magnetic flux leaked from an actuator for moving a lens to irradiate a light beam, for example, can be utilized.

Further, according to the present embodiment, there are only two types of magnetization status of a reproduction layer 9, either an upward magnetization or a downward magnetization, so that a contrast necessary for a super-resolution can be achieved.

An embodiment of the recording medium according to the present invention will be explained below in further detail with reference to the drawings.

Figure 4:
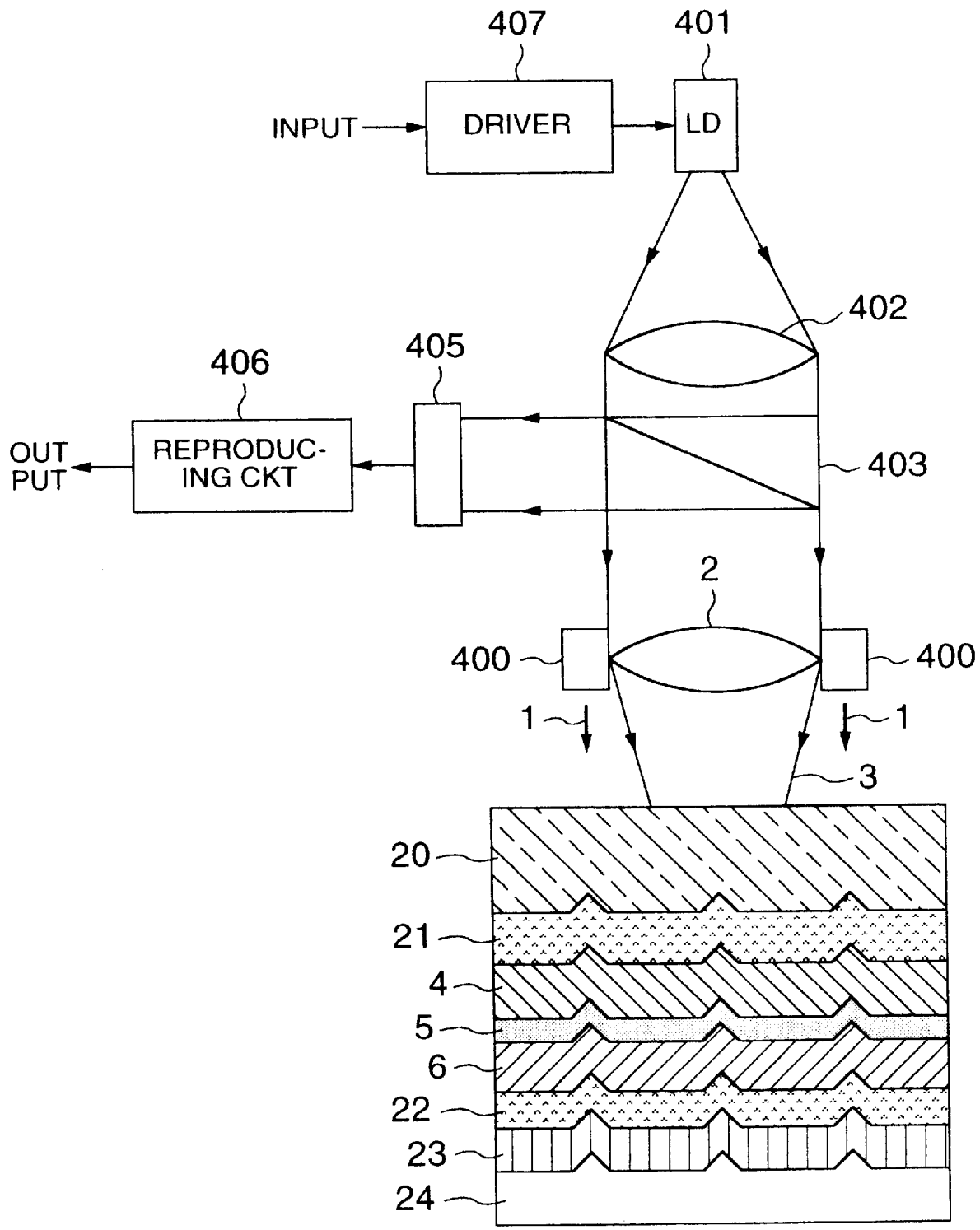
FIG. 4 is a diagram for showing the structure of the optical magnetic recording medium and an apparatus for recording the same relating to one embodiment of the present invention.

FIG. 4 is a diagram for showing an optical magnetic recording medium relating to one embodiment of the present invention. Reference numeral 20 denotes an optically transparent substrate, 21 a nitride dielectric film which is a first dielectric film, 4 a Gd22Fe58Co20 layer which is a reproduction layer, 5 a Sm17Fe43Zr40 layer which is an intermediate layer, 6 a Tb22Fe68Co10 layer which is a recording layer, 22 a nitride dielectric film which is a second dielectric film, 23 an Al layer which is a reflection layer, and 24 a resin protection layer.

To be more specific, the optical magnetic recording medium shown in FIG. 4 is structured by laminating the nitride dielectric film 21 on the polycarbonate substrate 20 of 1.4 $\mu$m track pitches by about 65 nm, followed by a sequential lamination on top of the dielectric film 21, the Gd22Fe58Co20 layer 4 by about 30 nm, the Sm17Fe43Zr40 layer 5 by about 10 nm, the Tb22Fe68Co10 layer 6 by about 20 nm, the nitride dielectric film 22 by about 10 nm, and the Al layer 23 by about 40 nm, respectively.

The recording medium is generated by a high-frequency sputtering after exhausting to an ultimate pressure of $3 \times 10^{-7}$ Torr or below. The sputtering power applied to each layer is 1 kW for the nitride dielectric film 21, 1 kW for the Gd22Fe58Co20 film 4, 0.5 kw for the Sm17Fe43Zr40 film 5, 1 kW for the Tb22Fe68Co10 film 6, 1 kW for the nitride dielectric film 22, and 1 kW for the Al layer 23. The sputtering Ar gas pressure used for the metal layer is 3 mTorr and that used for the nitride dielectric film is 5 mTorr. The target size used has a diameter of 5 inches.

A light beam 3 for recording to and reproducing from the recording medium is emitted from a laser light source 401 and is irradiated to the substrate 20 side through an objective lens 2. The light beam 3 is modulated according to the recording information by a laser driver 407 at the time of recording. The objective lens 2 is moved by actuators 400 so that the position of irradiating the light beam 3 onto a medium can be changed. Usually, a weak leakage magnetic field 1 is generated from the actuators. A light beam which is returned by being reflected from the medium is branched by a beam splitter 403 or the like and is photo-electrically converted by a detector 405 so that a detected signal is processed by a reproducing circuit 406.

Figure 1:
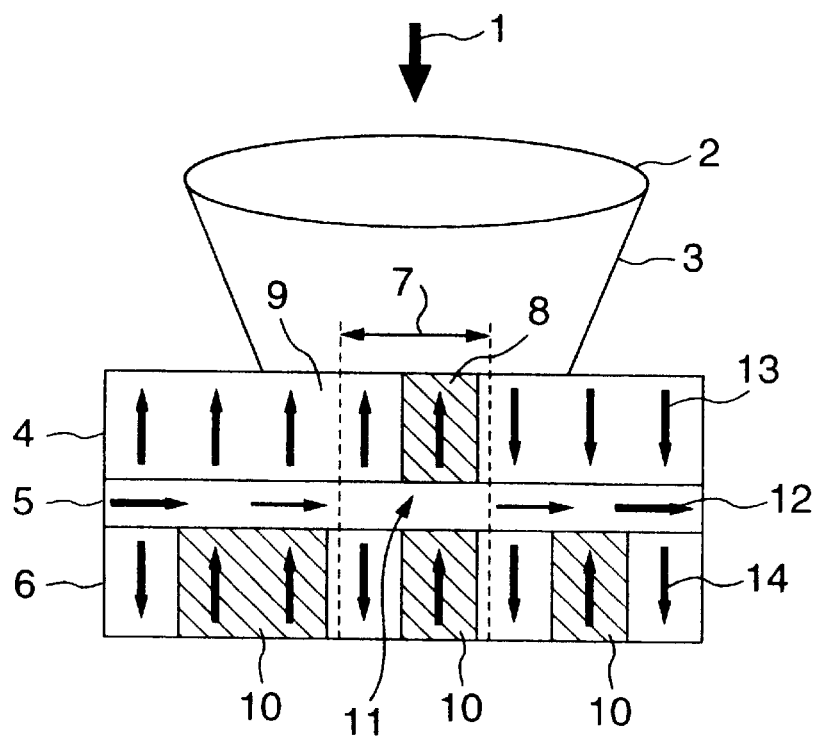
FIG. 1 is a schematic diagram for explaining the principle of a magnetic super-resolution operation of the optical magnetic recording medium relating to the present invention.

FIG. 1 is a diagram for explaining the principle of the magnetic super-resolution operation in the optical magnetic recording medium relating to the present embodiment. This is a diagram for showing a light spot irradiation portion in enlargement. The principle of the magnetic super-resolution operation of the optical magnetic recording medium relating to the present invention will be explained below by taking the optical magnetic recording medium relating to the embodiment shown in FIG. 4 as an example.

In general, a film in which a magnetization is not vertically carried out in plane in the normal status is called an "in-plane magnetization film". However, when the intermediate layer 5 is sandwiched between the GdFeCo layer 4 and the TbFeCo layer 6, the magnetization of the intermediate layer 5 receives a magnetic influence from the upper and lower layers so that the intermediate layer 5 has a perpendicular magnetic component. In this case, the GdFeCo layer 4 is influenced to a large extent by the magnetization status of the TbFeCo layer 6. This corresponds to the magnetic field received from other magnetic layers as expressed in the above-described expression (1). Accordingly, in order to reduce the initialization magnetic field, it is necessary to use an intermediate layer having an in-plane component even if the intermediate layer is sandwiched between the GdFeCo layer and the TbFeCo layer.

A magneto-optical effect at a room temperature is measured from the side of the GdFeCo reproduction layer 4 by using a sample of the GdFeCo reproduction layer 4 and the TdFeCo recording layer 6, the magnetization on both layers of which is saturated. As a result, the hysteresis loop of the reproduction layer 4 becomes almost point-symmetrical with the magnetic field.

In this case, since the coercive force of the GdFeCo which is the material of the reproduction layer 4 is smaller than the coercive force of the magnetic field of the TbFeCo which is the material of the recording layer 6, only the hysteresis loop of the GdFeCo layer is observed. This shows that the reproduction layer is independent of the information of the recording layer. When the coercive force of the GdFeCo at 50° C. with the rectangularity ratio 0.9 or above is larger than the sum of the coercive force of the magneto-statically coupled magnetic field and the exchange-coupled magnetic field received by the reproduction layer at 50° C., as manufactured under various conditions, the information of the recording layer is not copied to the reproduction layer. Further, in order to erase a magnetic domain once copied by the reproduction light, it is necessary that the coercive force of the reproduction layer is smaller than the coercive force of an externally applied magnetic field of 200 Oe or below which is considered to be desirable for the structure of an apparatus. The externally applied magnetic field of the optical magnetic recording apparatus used in this case, including the leakage magnetic field of the actuator, is about 200 Oe in the direction in which the magnetic domain of the reproduction layer can be erased.

In contrast to this, when a magneto-optical effect is measured from the recording layer side, a hysteresis loop peculiar to the TbFeCo which is the material of the recording layer can be observed.

FIG. 3 shows a hysteresis loop which is measured when the GdFeCo layer 4 and the TbFeCo layer 6 are mutually switchingly coupled. When the GdFeCo layer 4 and the TbFeCo layer 6 are mutually switchingly coupled, the hysteresis loop of the GdFeCo layer 4 with a small coercive force is loop-shifted by a component of exchange-coupled magnetic field 18 by the TbFeCo layer 6.

However, in the measurement result of the embodiment shown in FIG. 4, no loop shift is observed at all. This means that since the magnetization of the intermediate layer 5 has an in-plane component, a combined magnetic field of the leakage magnetic field from the TbFeCo layer 6 and the exchange-coupled magnetic field are shielded and they are not transferred to the side of the reproduction layer 4.

In the case of a disk using a non-magnetic layer for the intermediate layer 5, a copied magnetic domain appears in the GdFeCo layer 4 by the leakage magnetic field from the TbFeCo layer 6 at the room temperature. Since the copied magnetic domain is observed in a range of temperature from ambient temperature to a high temperature, a magnetic super-resolution effect is not obtained satisfactorily. In order to avoid this, an in-plane magnetization film for shielding the leakage magnetic field from the TbFeCo is used for the intermediate layer.

An over-writable optical magnetic medium using an in-plane magnetization film exists in the intermediate layer. In this intermediate layer, magnetization faces in-plane in a single layer but the magnetization faces an in-plane perpendicular direction when the intermediate layer is sandwiched between the GdFeCo layer and the TbFeCo layer. Accordingly, the TbFeCo and GdFeCo are switchingly coupled and they mutually operate magnetically so that a copied magnetic domain appears in the GdFeCo layer. Accordingly, a copied magnetic domain is observed in the range from the room temperature to a high temperature, and a magnetic super-resolution phenomenon does not occur.

As described above, in order to structure a recording film in which the magnetic domain of the TbFeCo is not copied to the GdFeCo layer at the ambient temperature but the magnetic domain is copied to only a heated high-temperature portion at the time of reproduction, an in-plane magnetization film is used for the intermediate layer. As the in-plane magnetization film, it is desirable to use a magnetic material using Fe, Co and Ni as base alloys or a ferromagnetic material which is structured by adding an element for achieving a suitable Curie temperature (such as Zr, Cr, etc., for example) to an alloy SmFe or SmCo with a light rare earth element. In this case, the SmDeZr film 5 is used.

For the evaluation of the disk, a drive of the wavelength 680 nm and the numerical aperture NA 0.55 for the objective lens is used. The conditions for the evaluation are 4.2 m/sec. for a linear velocity and 7 MHz for a recording frequency.

Further, in order to stably record a small magnetic domain, an optical magnetic field modulation recording system of a recording magnetic field ±200 Oe is employed.

This is a recording method for modulating a magnetic field corresponding to a code data while irradiating an optical pulse. Further, for carrying out a focusing or a tracking, generally an actuator for controlling a position of the objective lens in the magnetic field is used. A magnet is used for this actuator, and at the time of a reproduction, a leakage magnetic field of about 100 Oe from the actuator (reference FIG. 1) is given to the disk.

When the power of reproduction light is small and the rise in the temperature of a recording film is small, the magnetization of the GdFeCo layer 4 of the coercive force not higher than 100 Oe all faces in one direction along with this leakage magnetic field (reference FIG. 1). Accordingly, the information recorded on the TbFeCo layer 6 is not transmitted to the GdFeCo layer. Therefore, usually no signal appears at the reproduction power 1.0 mW.

However, when the reproduction power is 2.7 mW and the temperature of the center portion of the light spot is close to 140° C., the intermediate layer 5 can no longer shield the leakage magnetic field from the magnetic domain recorded in the TbFeCo layer 6, and the leakage magnetic field is copied to the GdFeCo layer 4, which results in an appearance of an asymmetrical reproduction waveform peculiar to the magnetic super-resolution.

In this case, 47 dB is obtained as the signal-to-noise ratio because a 0.3 µm magnetic domain is stably recorded by an optical magnetic field modulation and a magnetic super-resolution is ideally generated.

As described above, according to the optical magnetic recording medium relating to the present embodiment, a magnetic super-resolution phenomenon is generated in which recorded information is not observed at a low temperature but the recorded information is observed at a high temperature.

In FIG. 1, referance numeral 7 denotes a region in which the magnetic field of the intermediate layer (SmFeZr film) 5 disappears and the recorded magnetic domain is observed, 8 a magnetic domain which can be observed by being copied based on the above-described principle, 9 a region magnetic domain in which the recorded magnetic domain is not observed by being masked by the magnetic field of the intermediate layer 5, 10 a recorded magnetic domain of the recording layer (TbFeCo layer) 6, 11 a region in which the Curie temperature is exceeded, 12 an in-plane magnetization, 13 a perpendicular magnetization of the reproduction layer (GdFeCo layer) 4, and 14 denotes a perpendicular magnetization of the recording layer 6.

According to the above-described embodiment, based on the structure that only the magnetization of the intermediate layer of the recording film faces inside the film plane among the multiple films and the Curie temperature of the intermediate magnetic film is lower than the Curie temperature of other magnetic films, it is possible to achieve an optical magnetic recording medium which does not require an initialization magnetic field and a reproduction magnetic field and which can achieve a high-density reproduction with a magnetic super-resolution effect.

Another embodiment of the present invention will be explained below.

In the present embodiment, a recording film similar to the one used in the first embodiment explained above is manufactured on a polycarbonate substrate of a land width of 0.7 µm and a trench width of 0.7 µm, and this recording film is evaluated under the same conditions as those used for the first embodiment. The depth of the trench is about 50 nm.

At first, a random pattern is recorded in the land section and a signal amplitude in this case is measured. The recording width is 0.6 µm.

Next, the tracking is changed with the trench and the amplitude of a leakage signal from an adjacent track is measured. The ratio of the amplitude of the leakage signal on the trench to the amplitude of the signal on the land is obtained as 32 dB. This value is considered to be sufficiently practical when it is 25 dB or above.

According to the present embodiment, it is also possible to realize an optical magnetic recording medium which does not require an initialization magnetic field and a reproduction magnetic field and which can achieve a high-density reproduction with a magnetic super-resolution effect.

It is needless to mention that each of the above-described embodiments is one example of the preset invention and that the present invention is not limited to the above-described embodiments.

As described above in detail, according to the present invention, a remarkable effect can be obtained that it is possible to realize an optical magnetic recording medium which can carry out a high-density reproduction of a magnetic super-resolution effect that does not require an initialization magnetization or a reproduction magnetization, by using an in-plane magnetization film in the intermediate layer of exchange-coupled three layer films, and a recording and reproducing method using this optical magnetic recording

What is claimed is:

1. An optical magnetic recording medium, comprising:
   a first perpendicular-magnetization film for holding information in a status of the magnetization directions of magnetic domains in the first perpendicular-magnetization film;
   a second perpendicular-magnetization film;
   an intermediate layer positioned between said first and second perpendicular-magnetization films;
   wherein:
      a Curie temperature of said intermediate layer is lower than that of said first and second perpendicular-magnetization films;
      said intermediate layer prevents a magnetization direction of said first perpendicular-magnetization film from being copied to said second perpendicular-magnetization film in any region where the temperature of said intermediate layer is lower than the Curie temperature of the intermediate layer; and
      said intermediate layer copies a magnetization direction of said first perpendicular-magnetization film to said second perpendicular-magnetization film in every region where the temperature of said intermediate layer is higher than the Curie temperature .

2. An optical magnetic reproducing method using an optical magnetic recording medium that has a first perpendicular-magnetization film for holding information in a status of the magnetization directions of magnetic domains in the first perpendicular-magnetization film , a second perpendicular-magnetization flim, positioned at a nearer side irradiated by a laser light than said first perpendicular-magnetization film, and an intermediate layer positioned between said first and second Perpendicular-magnetization magnetic films; wherein:
   a Curie temperature of said intermediate layer is lower than that of said first and second perpendicular-magnetization films, said intermediate layer prevents a magnetization direction of said first perpendicular-magnetization film from being copied to said second perpendicular-magnetization film in any region where the temperature of said intermediate layer is lower than the Curie temperature of the intermediate layer, and said intermediate layer copies a magnetization direction of said first perpendicular-magnetization film to said second perpendicular-magnetization film in every region where the temperature of said intermediate layer is higher than the Curie temperature of the intermediate layer; the method comprising the steps of:

keeping said intermediate layer within a temperature range lower than the Curie temperature of said intermediate layer at ambient temperature; and heating said intermediate layer locally to a temperature higher than the Curie temperature of said intermediate layer by irradiation of an energy beam so that information on said first perpendicular-magnetization film is copied to said second perpendicular-magnetization film at the time of an information reproduction.

3. An optical magnetic recording medium according to claim 1, wherein a sum of the coercive force of said second perpendicular-magnetization film, the magnetostatically coupled magnetic field and the exchange-coupled magnetic field received by said second perpendicular-magnetization film is smaller than 200 Oe at an ambient temperature of 50°C.

4. An optical magnetic recording medium according to claim 1, wherein said intermediate layer is structured by a magnetic substance using a ferromagnetic material as a base.

5. An optical magnetic recording medium according to claim 1, wherein said second perpendicular-magnetization film has a hysteresis with a rectangularity ratio of 0.9 or above at an ambient temperature of 50° C.

6. An optical magnetic recording medium according to claim 1, wherein said intermediate layer has an in-plane magnetization component in a region where the temperature of said intermediate layer is lower than the Curie temperature of said intermediate layer.

7. An optical magnetic recording method according to claim 2, wherein a sum of the coercive force of said second perpendicular-magnetization film, the magnetostatically coupled magnetic field and the exchange-coupled magnetic field received by said second perpendicular-magnetization film is smaller than 200 Oe at an ambient temperature of 50° C.

8. An optical magnetic recording method according to claim 2, wherein said intermediate layer is structured by a magnetic substance using a ferromagnetic material as a base.

9. An optical magnetic recording method according to claim 2, wherein said second perpendicular-magnetization film has a hysteresis with a rectangularity ratio of 0.9 or above at an ambient temperature of 50° C.

10. An optical magnetic recording method according to claim 2, wherein said intermediate layer has an in-plane magnetization component in a region where the temperature is lower than the Curie temperature.

11. An optical magnetic recording method according to claim 2, further including the step of applying an external magnetic field to said optical magnetic recording medium.

12. An optical magnetic reproducing method according to claim 11, wherein said external magnetic field is smaller than 200 Oe.

13. An optical magnetic recording method according to claim 11, wherein said external magnetic field includes a magnetic flux leaked from an actuator for moving a lens.

* * * * *